US008782397B2

(12) United States Patent
Arnold et al.

(10) Patent No.: US 8,782,397 B2
(45) Date of Patent: Jul. 15, 2014

(54) COMPACT ATTRIBUTE FOR CRYPTOGRAPHICALLY PROTECTED MESSAGES

(75) Inventors: Todd W. Arnold, Charlotte, NC (US); Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/985,419

(22) Filed: Jan. 6, 2011

(65) Prior Publication Data
US 2012/0179903 A1 Jul. 12, 2012

(51) Int. Cl.
*H04L 9/32* (2006.01)

(52) U.S. Cl.
CPC .............. *H04L 9/3247* (2013.01); *H04L 9/321* (2013.01)
USPC ....................................................... 713/155

(58) Field of Classification Search
None
See application file for complete search history.

(56) References Cited

U.S. PATENT DOCUMENTS

| | | | | |
|---|---|---|---|---|
| 5,231,668 | A * | 7/1993 | Kravitz | 380/28 |
| 5,659,616 | A | 8/1997 | Sudia | |
| 6,085,320 | A * | 7/2000 | Kaliski, Jr. | 713/168 |
| 6,189,098 | B1 * | 2/2001 | Kaliski, Jr. | 713/168 |
| 6,914,985 | B1 | 7/2005 | Shrader et al. | |
| 7,095,852 | B2 | 8/2006 | Wack et al. | |
| 7,363,495 | B2 * | 4/2008 | Felt et al. | 713/170 |
| 7,398,396 | B2 | 7/2008 | Arditi et al. | |
| 7,424,616 | B1 | 9/2008 | Brandenburg et al. | |
| 7,496,199 | B2 | 2/2009 | Camus et al. | |
| 7,657,932 | B2 * | 2/2010 | Ballinger et al. | 726/9 |
| 2002/0029337 | A1 * | 3/2002 | Sudia et al. | 713/176 |
| 2003/0154401 | A1 * | 8/2003 | Hartman et al. | 713/201 |
| 2003/0225697 | A1 * | 12/2003 | DeTreville | 705/51 |
| 2004/0139352 | A1 | 7/2004 | Shewchuk et al. | |
| 2005/0138363 | A1 * | 6/2005 | Fox et al. | 713/156 |
| 2005/0235153 | A1 * | 10/2005 | Ikeda | 713/176 |
| 2006/0080352 | A1 * | 4/2006 | Boubez et al. | 707/102 |
| 2006/0129817 | A1 * | 6/2006 | Borneman et al. | 713/170 |
| 2007/0113222 | A1 | 5/2007 | Dignum et al. | |
| 2008/0066158 | A1 * | 3/2008 | Dillaway et al. | 726/4 |
| 2008/0091950 | A1 * | 4/2008 | Hofmann et al. | 713/176 |
| 2008/0222425 | A1 * | 9/2008 | Buss | 713/185 |
| 2008/0288278 | A1 * | 11/2008 | Buss | 705/1 |
| 2009/0319781 | A1 * | 12/2009 | Byrum et al. | 713/156 |

(Continued)

OTHER PUBLICATIONS

Phan, Cecilia; Mettala, Erik; Fleischer, Rod; "Coalition Information Sharing." Military Communications Conference (MILCOM), IEEE, Oct. 2007.*

(Continued)

*Primary Examiner* — Venkat Perungavoor
*Assistant Examiner* — Christopher Ruprecht
(74) *Attorney, Agent, or Firm* — Schmeiser, Olsen & Watts, LLP; Matthew Chung (57) ABSTRACT

A system and associated method for verifying a signature of a signed message having a compact attribute. Components of the compact attribute of the signed message appear in a predefined order within the compact attribute, and are identified by an object identifier associated with the compact attribute. A processing flag and a security assertion are among the components of the compact message. The processing flag directs rules to process the security assertion. The security assertion is made by an authority trusted by both a sender and a recipient of the signed message. The recipient validates the signature of the signed message based on the processing flag and the security assertion recovered from the compact attribute.

20 Claims, 7 Drawing Sheets

(56) References Cited

U.S. PATENT DOCUMENTS

2009/0319795 A1* 12/2009 Sharif et al. .................. 713/176
2010/0138662 A1* 6/2010 Ikeda ............................ 713/179
2010/0269149 A1* 10/2010 Lee et al. .......................... 726/1
2011/0030041 A1* 2/2011 Favazza et al. ................... 726/5

OTHER PUBLICATIONS

Housley, R.; "Cryptographic Message Syntax (CMS) (RFC5652)". Standards Track, IPCOM000187778D, Sep. 2009.*
Chang et al. Towards attribute encryption and a generalized encryption model for XML. International Conference on Internet Computing—IC'03, Las Vegas, NV, USA, Jun. 23-26, 2003. Published in: International Conference on Internet Computing—IC'03, pp. 455-461 vol. 2. CSREA Press, USA, 2003.
"Karlinger, G. XML electronic signatures—application according to the international standard XML Signature Syntax and Processing. INSPEC Abstract. Conference: Communications and Multimedia Security Issues of the New Century. IFIP TC6/TC11 Fifth Joint Working Conference on Communications and Multimedia Security (CMS'01), Darmstadt, Germany, May 21-22, 2001. Published in : Communications and Multimedia Security Issues of the New Century. IFIP TC6/TC11 Fifth Joint Working Conference on Communications and Multimedia Security (CMS'01), 15-23. Kluwer Academic Publishers, Norwell, MA, USA, 2001, x+393+34 pp. 8 Ref. Copyright 2001, IEEE."
Wouters et al. Towards an XML Format for Time-Stamps. ACM Workshop on XML Security, Nov. 22, 2002, Fairfax VA, USA. ACM1581136323/02/0011. 10 pages.
Ruiz-Martinez et al. A New Fair Non-Repudiation Protocol for Secure Negotiation and Contract Signing. PST 2006, Oct. 30-Nov. 1, 2006, Markham, Ontario, Canada. ACM 1-59593-604-1/06/00010. 11 pages.
EC XML Parser for parsing XML into Java Hashtable. IBM TDB. IPCOM000013898D. Original Publication Date: Aug. 1, 2000. 4 pages.
International Search Report (Mail Date May 14, 2012) for International application No. PCT/CA2012/050005; International Filing Date Jan. 5, 2012; 3 pages.

* cited by examiner

```
L101:    <Attribute>

L102:    <type> 1.3.133.16.840.9.73.1.0 </type>

L103:    <values>
L104:    <SET>
L105:    <XMLcontent>

L106:        <rules>
L107:        <ProcessingRule>
L108:        <ruleName> 1.2.3.4.5 </ruleName>

L109:        </ProcessingRule>
L110:        </rules>

L111:        <type>
L112:        <saml> -- SAML content goes here -- </saml>
L113:        </type>
L114:    </XMLcontent>
L115:    </SET>
L116:    </values>
L117:    </Attribute>
```

FIG. 3

```
L201:   XML-Attribute DEFINITIONS IMPLICIT TAGS ::= BEGIN

L202:   XMLcontent ::= SEQUENCE {
L203:   rules ProcessingRules OPTIONAL,
L204:   types XMLcontents
L205:   }

L206:   ProcessingRules ::= SEQUENCE SIZE(1..MAX) OF ProcessingRule

L207:   ProcessingRule ::= SEQUENCE {
L208:   ruleName RULES.&id({Processing}),
L209:   semantics RULES.&Type({Processing}) OPTIONAL
L210:   }

L211:   Processing RULES ::= {
          -- User-defined attribute processing rules --
L212:   }

L213:   XMLcontents ::= SEQUENCE {
L214:   saml [0] SAMLvalues OPTIONAL,
L215:   spml [1] SPMLvalues OPTIONAL,
L216:   wsAuthorization [2] WSauthorizationValues OPTIONAL,
L217:   wsBaseNotification [3] WSbaseNotificationValues OPTIONAL,
L218:   wsdl [4] WSDLvalues OPTIONAL,
L219:   wsFederation [5] WSfederationValues OPTIONAL,
L220:   wsKerberos [6] WSkerberosValues OPTIONAL,
L221:   wsPolicy [7] WSpolicyValues OPTIONAL,
L222:   wsPrivacy [8] WSprivacyValues OPTIONAL,
L223:   wsProvisioning [9] WSprovisioningValues OPTIONAL,
L224:   wsSsecureConversation [10] WSsecureConversationValues OPTIONAL,
L225:   wsSecurity [11] WSsecurity OPTIONAL,
L226:   wsSecurityKerberos [12] WSsecurityKerberos OPTIONAL,
L227:   wsSecurityPolicy [13] WSsecurityPolicy OPTIONAL,
L228:   wsTrust [14] WStrustValues OPTIONAL,
L229:   wsXACML [15] XACMLvalues OPTIONAL,
L230:   wsXKMS [16] XKMSvalues OPTIONAL,
L231:   extensions [17] Extensions OPTIONAL
L232:   }
L233:   (ALL EXCEPT ({ -- none; at least one component present --}))

L234:   Extensions ::= SEQUENCE SIZE(1..MAX) OF Extension

L235:   Extension ::= SEQUENCE {
L236:   type MARKUP.&id({XMLtypes}),
L237:   values SEQUENCE SIZE(1..MAX) OF MARKUP.&Type({XMLtypes})
                                                           OPTIONAL}
```

FIG. 4

```
L301:   XMLtypes MARKUP ::= {
        .. -- Additional XML content types -
L302:   }

L303:   SAMLvalues ::= SEQUENCE SIZE(1..MAX) OF UTF8String (
                        CONSTRAINED BY { -- SAML V2.0 subclause 1.3.1 -- })
L304:   SPMLvalues ::= SEQUENCE SIZE(1..MAX) OF SAMLmarkup
L305:   WSauthorizationValues ::= SEQUENCE SIZE(1..MAX) OF UTF8String
L306:   WSbaseNotificationValues ::= SEQUENCE SIZE(1..MAX) OF
                                        UTF8String
L307:   WSDL ::= SEQUENCE SIZE(1..MAX) OF UTF8String
L308:   WSfederationValues ::= SEQUENCE SIZE(1..MAX) OF UTF8String
L309:   WSkerberosValues ::= SEQUENCE SIZE(1..MAX) OF UTF8String
L310:   WSpolicyValues ::= SEQUENCE SIZE(1..MAX) OF UTF8String
L311:   WSprivacyValues ::= SEQUENCE SIZE(1..MAX) OF UTF8String
L312:   WSprovisioningValues ::= SEQUENCE SIZE(1..MAX) OF UTF8String
L313:   WSsecureConversationValues ::= SEQUENCE SIZE(1..MAX) OF
                                        UTF8String
L314:   WSsecurity ::= SEQUENCE SIZE(1..MAX) OF UTF8String
L315:   WSsecurityKerberos ::= SEQUENCE SIZE(1..MAX) OF UTF8String
L316:   WSsecurityPolicy ::= SEQUENCE SIZE(1..MAX) OF UTF8String
L317:   WStrustValues ::= SEQUENCE SIZE(1..MAX) OF UTF8String
L318:   XACMLvalues ::= SEQUENCE SIZE(1..MAX) OF UTF8String
L319:   XKMSvalues ::= SEQUENCE SIZE(1..MAX) OF UTF8String -- Information objects classes--
L320:   MARKUP ::= CLASS {
L321:   &id OBJECT IDENTIFIER UNIQUE,
L322:   &Type OPTIONAL
L323:   }
L324:   WITH SYNTAX { XML &id [ MARKUP &Type ] }

L325:   RULES ::= CLASS {
L326:   &id OBJECT IDENTIFIER UNIQUE,
L327:   &Type OPTIONAL
L328:   }
L329:   WITH SYNTAX { RULE &id [ SYNTAX &Type ] }

-- Information object identification --
L330:   OID ::= OBJECT IDENTIFIER - Alias
L331:   id-cms-attributes OID ::= { iso(1) identified-organization(3)
                                    tc68(133) country(16) x9(840)
                                    x9Standards(9) x9-73(73)
                                    attributes(1)}
L332:   xmlMarkup OID ::= { id-cms-attributes xml(0) }
L333:   END -- XML-Attribute --
```

COMPACT ATTRIBUTE FOR CRYPTOGRAPHICALLY PROTECTED MESSAGES

BACKGROUND

Conventional cryptographically protected message syntax employs a separate attribute for each content type and format, which results in complex attribute representation and inefficient processing of attributes in a message.

BRIEF SUMMARY

According to one embodiment of the present invention, a method for verifying a signature of a signed message comprises: receiving, by a recipient, the signed message from a sender, wherein the signed message comprises a compact attribute comprising components appearing in a predefined order, the components being identified by an object identifier associated with the compact attribute, the components comprising a processing flag and a security assertion, wherein the processing flag comprises rules to process the security assertion, and wherein the security assertion is made by an authority trusted by both the sender and the recipient; recovering the components of the compact attribute comprising the processing flag and the security assertion, by parsing the signed message from said receiving; and validating the signature of the signed message based on the processing flag and the security assertion.

According to one embodiment of the present invention, a computer program product comprises a computer readable memory unit that embodies a computer readable program code. The computer readable program code contains instructions that, when run by a processor of a computer system, implement a method for verifying a signature of a signed message having a compact attribute.

According to one embodiment of the present invention, a computer system comprises a processor, a memory coupled to the processor, and a computer readable storage device coupled to the processor, said storage device containing program code configured to be executed by the processor via the memory to implement a method for verifying a signature of a signed message having a compact attribute.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for verifying a signature of a signed message having a compact attribute.

BRIEF DESCRIPTION OF THE SEVERAL VIEWS OF THE DRAWINGS

FIGS. 4 & 5 are an example of the XML attribute definition as the compact attribute of the signed message in Abstract Syntax Notation One (ASN.1) format as used in the Cryptographic Message Syntax (CMS) messages, in accordance with the embodiments of the present invention.

DETAILED DESCRIPTION

Figure 1:
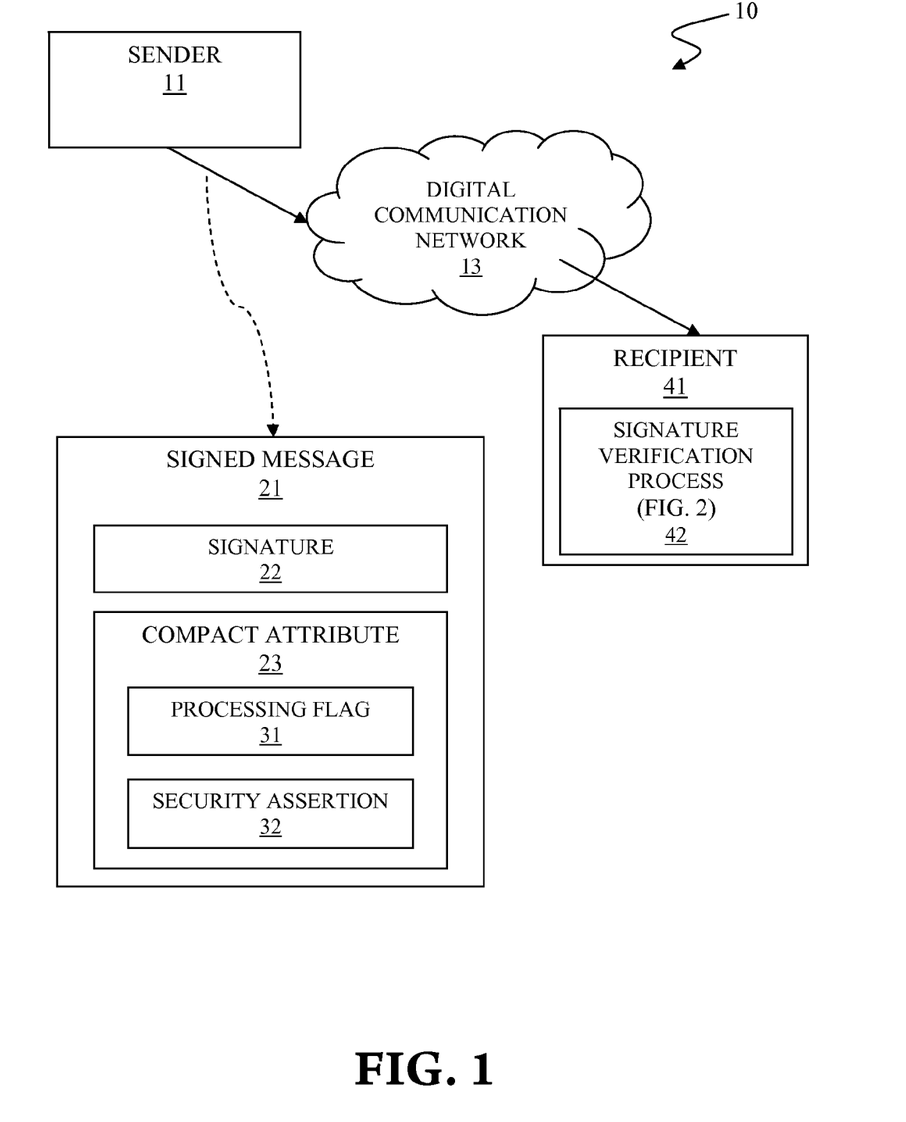
FIG. 1 illustrates a system for secure communication using a cryptographically protected message having a compact attribute, in accordance with embodiments of the present invention.

FIG. 1 illustrates a system 10 for secure communication using a signed message 21 having a compact attribute 23, in accordance with embodiments of the present invention.

The system 10 comprises a sender 11, a recipient 41, and a digital communication network 13 that couples the sender 11 and the recipient 41. The sender 11 and the recipient 41 run on a respective generic computer system. See descriptions of FIG. 6 infra for details of the computer system.

The sender 11 generates the signed message 21 that is cryptographically protected with a signature 22 within the signed message 21 according to a predefined syntax schema. In generating the signed message 21, the sender 11 requests a security assertion 32 from a trusted authority to certify the validity of a key used by the sender 11 to create the signature 22 of the signed message 21 and the trustworthiness of the signature 22. Because the security assertion 32 expires after a predefined period of time after the issuance of the security assertion, the sender 11 timestamps the signed message 11. The sender insert the security assertion 32 of the SAML Authority in a compact attribute 23 as a signed attribute content type. The sender 11 then sends the signed message 21 to the recipient 41 through the digital communication network 13. In this specification, terms "Security Assertion Markup Language (SAML) Authority", "Certification Authority (CA)", "Trusted Third Party (TTP)" are used interchangeably to indicate an entity trusted by both the sender 11 and the recipient 41.

The recipient 41 comprises a signature verification process 42 that verifies the signature 22 of the signed message 21 from the sender 11 by use of the security assertion 32 made by the SAML Authority. The recipient 41 receives the signed message 21 via the digital communication network 13 and parses the received signed message 21 by use of the signature verification process 42. In contrast with a conventional X.509 Certificate path validation method, verifying the security assertion 32 is efficient and speedy due to simpler format of the signed message 21 and a fixed order of content types appearing in the compact attribute 23 of the signed message 21. See descriptions of FIGS. 2A & 2B infra for steps performed by the signature verification process 42.

The signed message 21 comprises the signature 22 and the compact attribute 23. The compact attribute 23 comprises content types of processing flag 31 and security assertion 32. The signed message 21 further comprises sets of certificates and Certificate Revocation Lists (CRLs) enlisting revoked/expired certificates.

The compact attribute 23 is an object that carries respective values of one or more content type components. In one embodiment of the present invention, each content type component is an eXtensible Markup Language (XML) attribute type. The compact attribute 23 is identified by an object identifier (OID) and represented by use of a pair of attribute wrapper. Thus the compact attribute 23 enables the sender 11 to generate a shorter message than a message generated with conventional attributes of an encrypted message.

Within the compact attribute 23, each content type component appears in a predefined order. Thus, the sender 11 can eliminate duplicate values more easily than with conventional attributes without any order, and the recipient 41 can parse the compact attribute 23 of the signed message 21 much more efficiently due to the reduced message size and a fixed order of content type components within the compact attribute 23. The fixed order of content type components further enables the recipient 41 to determine whether or not a specific content type component exists in the compact attribute 23 in linear time by examining the order of appearance for the content type components in the compact attribute 23. Contrastingly, because any content type component can appear without a predefined order in conventional attributes, the recipient of a conventional signed message must search all values for an attribute to determine whether or not a certain content type component exists in the conventional signed message.

A processing flag 31 content type component of the compact attribute 23 comprises information for the recipient 41 of the signed message 21 indicating that the security assertion 32 included in the compact attribute 23 is used in place of a conventional certification mechanism to determine the validity and trustworthiness of the signature 22 of the signed message 21. An example of conventional certification mechanism may be, inter alia, X.509 Certificate path validation standard for a public key infrastructure (PKI) by the Telecommunication Standardization Sector (ITU-T) of the International Telecommunication Union (ITU), etc.

In one embodiment of the present invention, the signed message 21 accommodates both compact binary and XML format representations of the Cryptographic Message Syntax (CMS) messages by use of the compact attribute 23. The signed message 21 is in SignedData format according to the Cryptographic Message Syntax (CMS) by the American National Standards Institute (ANSI) published in ANSI X9.73-2010 in Abstract Syntax Notation One (ASN.1) format. In the same embodiment, the security assertion 32 is in the Security Assertion Markup Language (SAML) format.

With conventional attributes for encrypted messages using conventional cryptographic message syntax, each content type of attribute requires a respective object identifier. Consequently, when an encrypted message needs to contain two eXtensible Markup Language (XML) content types, the encrypted message requires two separate attributes. Each attribute of the encrypted message is defined as a distinctive object with a unique object identifier and represented within a separate pair of attribute wrappers, which results in duplicated markups to represent many conventional attributes. For example, the encrypted message comprises a security content type that is in the Security Assertion Markup Language (SAML) format and a key management content type that is defined by the XML Key Management Services (XKMS) protocol. The encrypted message must have two object identifiers for each content type, for example, a first object identifier '1.3.133.16.840.9.73.1.0.1' for the SAML content and a second object identifier '1.3.133.16.840.9.73.1.0.2' for the XKMS content.

Examples of conventional syntax for cryptographically protected messages may be, inter alia, the American National Standards Institute (ANSI) X9.73 Cryptographic Message Syntax (CMS) for compact binary messages, the ANSI X9.96 eXtensible Markup Language (XML) CMS, the ANSI X9.73-2010 containing XML content attributes, etc. The conventional cryptograph message syntaxes are represented in Abstract Syntax Notation One (ASN.1) schema, which is also a standard and flexible notation that describes data structures for representing, encoding, transmitting, and decoding data.

Users of cryptographically protected message need to carry various identified types of XML content that are commonly used in security software products. An example of the security software products may be, inter alia, IBM® Tivoli®, etc. (IBM and Tivoli are registered trademarks of International Business Machines Corporation in the United States and other countries.) Examples of XML content types may be, inter alia, Web Service Description Language (WSDL), Web Services Policy Framework (WS-Policy), Web Services Security Policy (WS-Security Policy), OASIS®eXtensible Access Control Markup Language (XACML), OASIS® Service Provisioning Markup Language (SPML), Web Services Federation Language/Specification (WS-Federation), Web Services Security Kerberos (WS-Kerberos) by IBM, Web Services Privacy Policy (WS-Privacy), etc. (OASIS is a registered trademark of OASIS Corporate in the United States and other countries.)

Incorporating all necessary XML content types in the signed message by use of conventional attributes in the Cryptographic Message Syntax (CMS) dramatically lengthens the signed message and complicates parsing of the signed message due to the lack of restriction as to the number and order of appearances of respective XML content type. See examples in FIGS. 3, 4, and 5 for representing XML content types in the compact attribute 23.

Figure 2A:
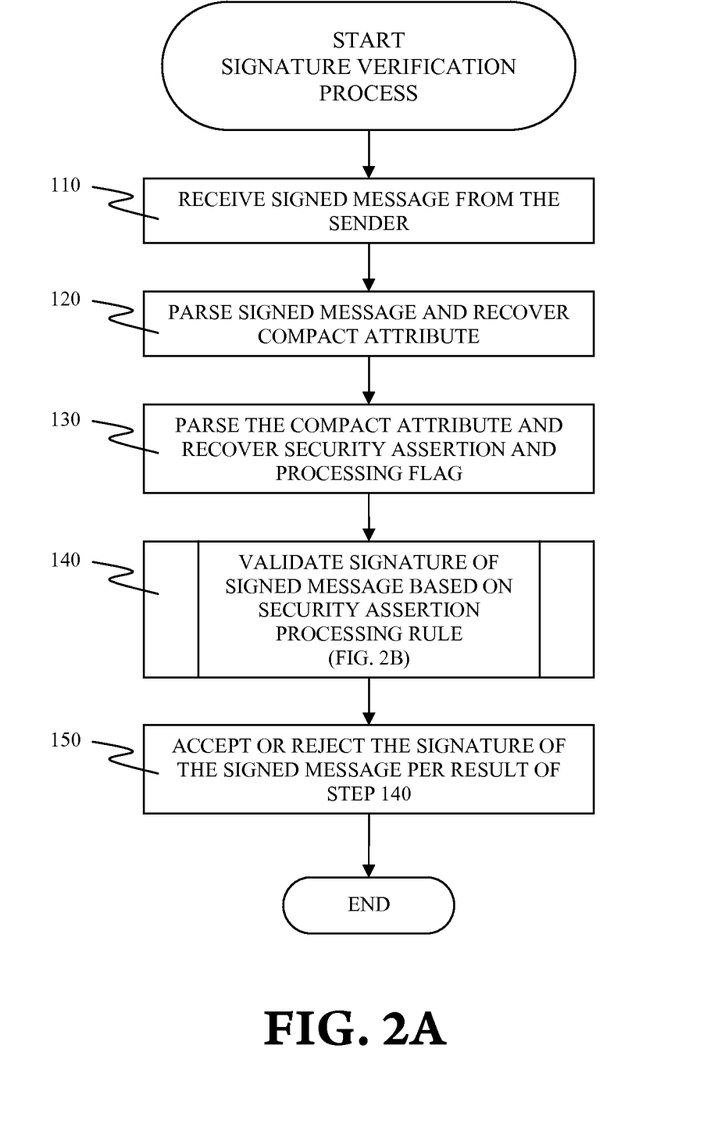
FIG. 2A is a flowchart depicting a method for verifying a signature of the cryptographically protected message of FIG. 1, which is performed by the recipient of FIG. 1, in accordance with the embodiments of the present invention.

FIG. 2A is a flowchart depicting a method for verifying a signature of the cryptographically protected message of FIG. 1 supra, which is performed by the recipient of FIG. 1 supra, in accordance with the embodiments of the present invention.

In one embodiment of the present invention, a digital signature scheme for cryptographically protected communication is implemented. A sender employs a key generation method that selects a private key and a corresponding public key for decryption in preparation of a message to send. Subsequently the sender signs the message with a signature. The sender then sends the signed message to a recipient. In this specification, key generation and signing processes performed by the sender is not described because the compact attribute does not affect the key generation and signing processes of the sender. The signature verification process of the recipient receives the signed message and verifies the signature by performing steps 110 through 200 as below.

In step 110, the signature verification process receives the signed message from the sender. Then the signature verification process proceeds with step 120.

In step 120, the signature verification process parses the signed message received in step 110 supra and recovers the compact attribute within the signed message. Then the signature verification process proceeds with step 130.

In step 130, the signature verification process parses the compact attribute recovered in step 120 supra and recovers a processing flag and a signed security assertion embedded in the compact attribute. Then the signature verification process proceeds with step 140.

In step 140, the signature verification process validates the signature of the signed message according to the processing rule set forth in the signed security assertion of the compact attribute. See descriptions of FIG. 2B infra for steps performed by the security assertion processing rule. Then the signature verification process proceeds with step 150.

In step 150, the signature verification process either accepts or rejects the signature of the signed message according to a result from step 140 supra. Then the signature verification process terminates. The recipient reports the result produced by the signature verification process to a user of the recipient as to the authenticity of the message.

Figure 2B:
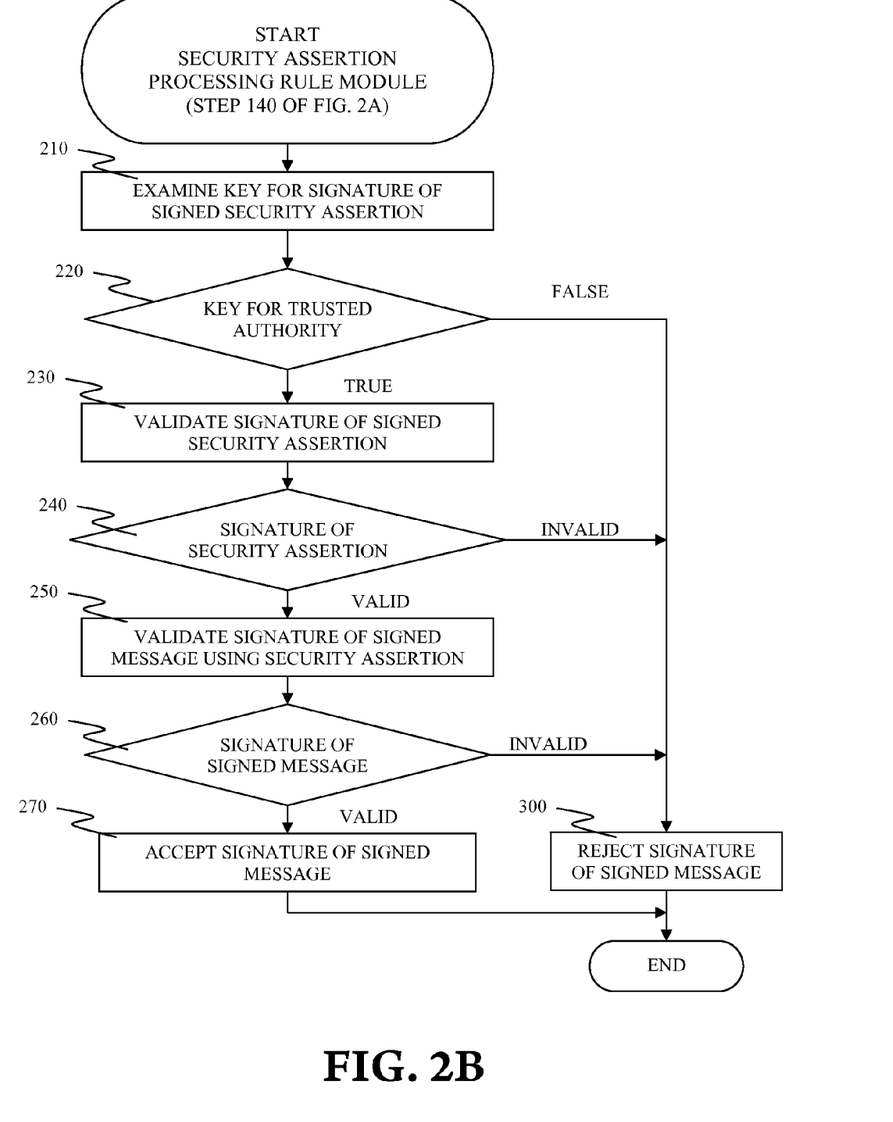
FIG. 2B is a flowchart depicting a method for verifying a signature of the signed message of FIG. 1, as performed in step 140 of FIG. 2A according to the processing rule in the compact attribute of the signed message, in accordance with the embodiments of the present invention.

FIG. 2B is a flowchart depicting a method for verifying a signature of the signed message of FIG. 1 supra, as performed in step 140 of FIG. 2A supra according to the processing rule in the compact attribute of the signed message, in accordance with the embodiments of the present invention.

In step 210, a processing rule module examines a key used in generating the signature of the signed security assertion, which identifies an entity making the security assertion. Then the processing rule module proceeds with step 220.

In step 220, the processing rule module determines if the entity which had signed the security assertion is a trusted authority. Both the sender and the recipient trust data signed by the trusted authority. If the processing rule module determines that the key for the signature of the signed security assertion indicates the trusted authority, then the processing rule module proceeds with step 230. If the processing rule module determines that the key for the signature of the signed security assertion does not indicate a trusted authority, then the processing rule module proceeds with step 300.

In step 230, the processing rule module validates the signature of the signed security assertion. Then the processing rule module proceeds with step 240.

In step 240, the processing rule module determines if the signature of the signed security assertion examined in step 230 supra is valid. If the processing rule module determines that the signature of the signed security assertion is valid, then the processing rule module proceeds with step 250. If the processing rule module determines that the signature of the signed security assertion is invalid, then the processing rule module proceeds with step 300.

In step 250, the processing rule module validates the signature of the signed message received in step 110 of FIG. 2A supra. Then the signature verification process proceeds with step 260.

In step 260, the processing rule module determines if the signature of the signed message examined in step 250 supra is valid. If the signature verification process determines that the signature of the signed message is valid, then the signature verification process proceeds with step 270. If the signature verification process determines that the signature of the signed message is invalid, then the signature verification process proceeds with step 300.

In step 270, the processing rule module accepts the signature of the signed message received in step 110 of FIG. 2A supra and terminates. The signature verification process proceeds with step 150 of FIG. 2A supra.

In step 300, the processing rule module rejects the signature of the signed message received in step 110 of FIG. 2A supra and terminates. The signature verification process proceeds with step 150 of FIG. 2A supra.

Figure 3:
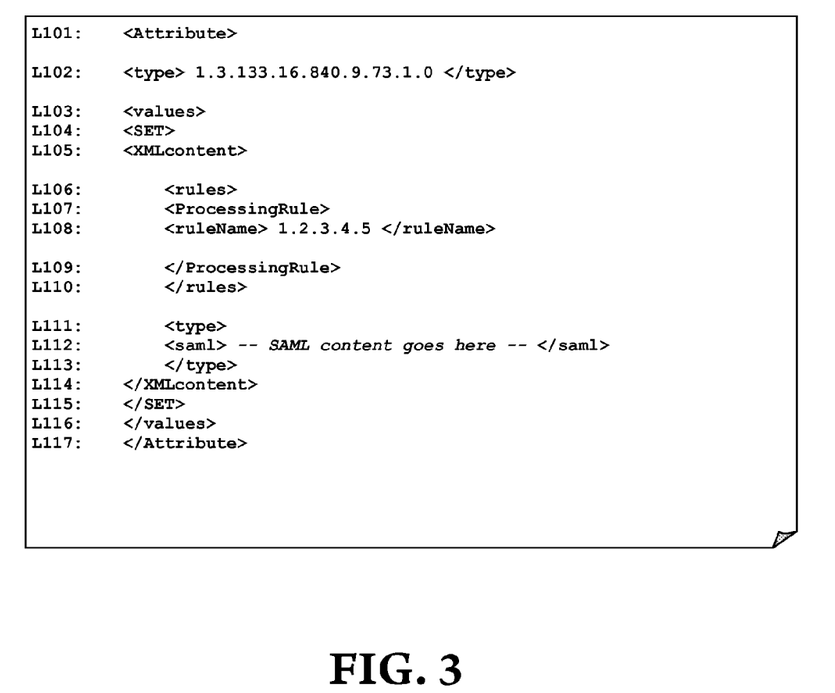
FIG. 3 is an example of the compact attribute definition for the signed message in Abstract Syntax Notation One (ASN.1) format as used in the Cryptographic Message Syntax (CMS) messages, in accordance with the embodiments of the present invention.

FIG. 3 is an example of the compact attribute definition for the signed message in Abstract Syntax Notation One (ASN.1) format as used in the Cryptographic Message Syntax (CMS) messages, in accordance with the embodiments of the present invention.

Lines L101 through L117 represent an attribute, listed within a pair of "Attribute" wrappers.

Line L102 represents a type of the attribute, which is an attribute identifier "1.3.133.16.840.9.73.1.0", listed within a pair of "type" wrappers.

Lines L103 through L116 represent values of the attribute comprising "SET" content type, listed within a pair of "values" wrappers.

Lines L104 through L115 represent two types of XML content attribute payload "ProcessingRule" and "saml", listed within respective pairs of wrappers.

The example of the compact attribute representation is obtained by encoding a value of an ASN.1 type using the XML Encoding Rules (XER) of ASN.1. The compact attributes as shown in FIG. 3 are suitable for use in applications implementing the Directory Access Protocol (DAP) for X.500 directory services or the Lightweight Directory Access Protocol (LDAP) for X.500 Lite directory services.

Lines L107 through L109 specify a processing rule. Line L108 provides a name of the processing rule, which is in Information Object Identifier format. The rule "1.2.3.4.5" inform the recipient of the signed message information as to, inter alia, a purpose of the XML content, direct application processing, how to process/handle the XML content in a specific location for processing, etc. Processing rule content type has an optional component "semantics", which holds values of any type chosen by the sender of the signed message, such as a Uniform Resource Identifier (URI) value that is used to provide informative content, or which could contain information that can be acted upon by the recipient. The "semantics" component also holds SAML assertions as to indicate that the SAML assertions should be used to verify the signature of the signed message, which improves CMS cryptographic message processing. See FIG. 4 infra for an example of "semantics" component in the Processing rule content type.

FIGS. 4 & 5 are an example of the XML attribute definition as the compact attribute of the signed message in Abstract Syntax Notation One (ASN.1) format as used in the Cryptographic Message Syntax (CMS) messages, in accordance with the embodiments of the present invention.

Lines L201 through L237 of FIG. 4 and lines L301 through L333 define a compact attribute. In FIG. 4, lines L202 through L205 represent that the compact attribute XML-Attribute is defined as a sequence wherein an optional component ProcessingRules appears first and then XMLcontents components follow. Lines L206 through L212 represent ProcessingRules definition. Lines L213 through L233 represent that the XMLcontents components are defined as a sequence of seventeen (17) optional subcomponents appear in a predefined order, and zero or more exception to the subcomponents of the XMLcontents component in line L233. Lines L234 through L237 define extensions to the compact attribute XML-Attribute.

In FIG. 5, lines L301 through L302 defines a holder for XML type MARKUP that is used in an extension defined in lines L235 through L237 of FIG. 4 supra. According to the extension definition, additional XML content types may be defined with the XML type MARKUP. Lines L304 through L320 represent a respective rule for values of the respective XML content types defined in the XMLcontents components of FIG. 4 supra. The compact attribute XML-Attribute is identified by a single object identifier OID and aliases shown in lines L330 through L332.

Figure 6:
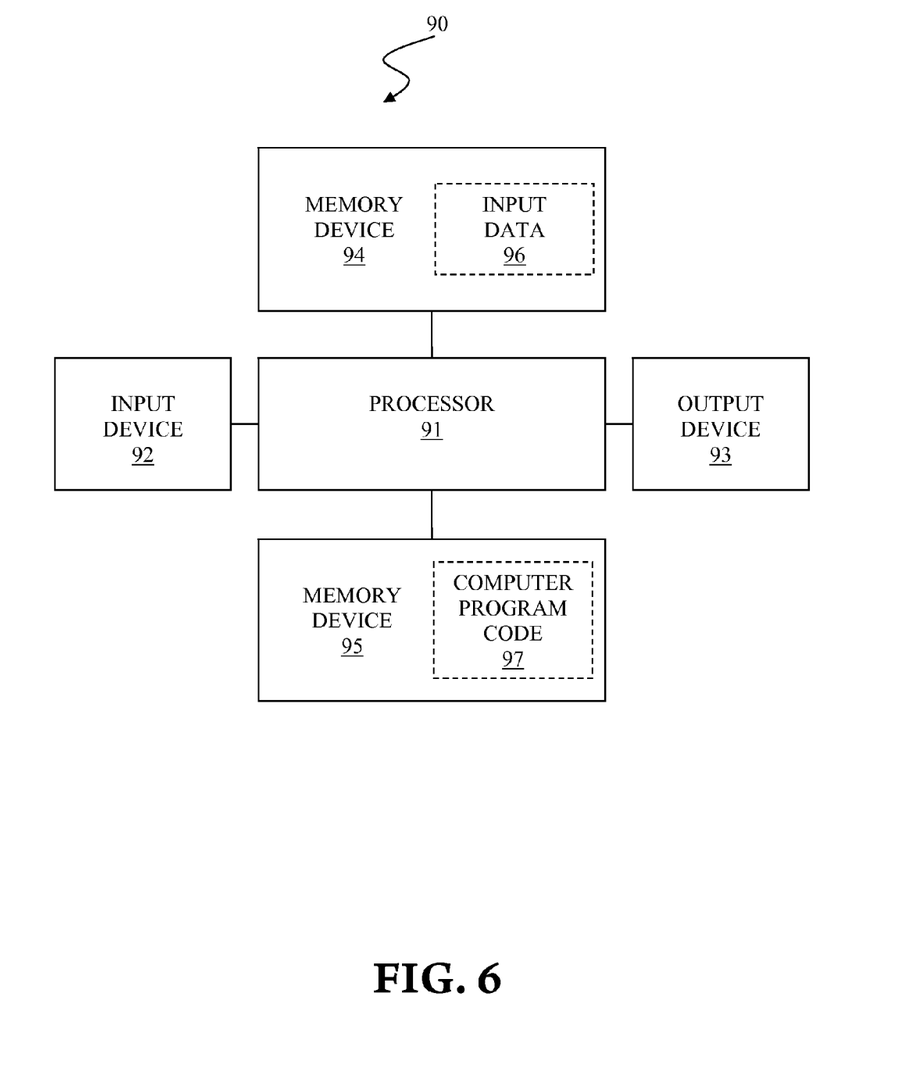
FIG. 6 illustrates a computer system used for secure communication using a signed message having a compact attribute, in accordance with the embodiments of the present invention.

FIG. 6 illustrates a computer system 90 used for secure communication using a signed message having a compact attribute, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VoIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for secure communication using a signed message having a compact attribute of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for secure communication using a signed message having a compact attribute.

In another embodiment, the invention provides a method that performs the process steps of the invention on a subscription, advertising and/or fee basis. That is, a service provider, such as a Solution Integrator, can offer to create, maintain, support, etc., a process for secure communication using a signed message having a compact attribute of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for verifying a signature of a signed message, said method comprising:
    receiving, by a recipient, the signed message from a sender, wherein the signed message comprises a compact attribute comprising a plurality of content types, the content types appearing in a predefined order within the compact attribute, the content types being collectively identified by a single object identifier associated with the compact attribute, the compact attribute comprising a processing flag and a security assertion, wherein the processing flag comprises rules to process the security assertion, and wherein the security assertion is made by an authority trusted by both the sender and the recipient;
    recovering the content types of the compact attribute comprising the processing flag and the security assertion, by parsing the signed message from said receiving, wherein said parsing comprises utilizing the predefined order of the content types within the compact attribute; and
    validating whether the signature of the signed message is valid based on the processing flag and the security assertion, wherein said validating comprises determining, via use of the rules, either that a key used in signing the security assertion identifies, or that the key does not identify, the authority trusted by both the sender and the recipient as a result of examining the key used in signing the security assertion.

2. The method of claim 1, said validating comprising:
    determining that the key used in signing the security assertion identifies the authority trusted by both the sender and the recipient as a result of examining the key used in signing the security assertion;
    after said determining that the key identifies the trusted authority, ascertaining that a signature of the security assertion is valid;
    after said ascertaining that the signature of the security assertion is valid, determining that the signature of the signed message is valid; and
    after said determining that the signature of the signed message is valid, accepting the signature of the signed message as valid.

3. The method of claim 1, said validating comprising:
    determining that the key used in signing the security assertion does not identify the authority trusted by both the sender and the recipient as a result of examining the key used in signing the security assertion; and
    rejecting the signature of the signed message as invalid.

4. The method of claim 1, said validating comprising:
    determining that the key used in signing the security assertion identifies the authority trusted by both the sender and the recipient as a result of examining the key used in signing the security assertion;
    determining that a signature of the security assertion is invalid subsequent to determining that the key identifies the trusted authority; and
    rejecting the signature of the signed message as invalid.

5. The method of claim 1, said validating comprising:
    determining that the key used in signing the security assertion identifies the authority trusted by both the sender and the recipient as a result of examining the key used in signing the security assertion;
    after said determining that the key identifies the trusted authority, ascertaining that a signature of the security assertion is valid;
    after said ascertaining that the signature of the security assertion is valid, determining that the signature of the signed message is invalid; and
    after said determining that the signature of the signed message is invalid, rejecting the signature of the signed message as invalid.

6. A computer program product comprising: a computer readable storage device having a computer readable program code embodied therein, said computer readable program code containing instructions that perform a method for verifying a signature of a signed message, said method comprising:
    receiving, by a recipient, the signed message from a sender, wherein the signed message comprises a compact attribute comprising a plurality of content types, the content types appearing in a predefined order within the compact attribute, the content types being collectively identified by a single object identifier associated with the compact attribute, the compact attribute comprising a processing flag and a security assertion, wherein the processing flag comprises rules to process the security assertion, and wherein the security assertion is made by an authority trusted by both the sender and the recipient;

recovering the content types of the compact attribute comprising the processing flag and the security assertion, by parsing the signed message from said receiving, wherein said parsing comprises utilizing the predefined order of the content types within the compact attribute; and validating whether the signature of the signed message is valid based on the processing flag and the security assertion, wherein said validating comprises determining, via use of the rules, either that a key used in signing the security assertion identifies, or that the key does not identify, the authority trusted by both the sender and the recipient as a result of examining the key used in signing the security assertion.

7. The computer program product of claim 6, said validating comprising:
   determining that the key used in signing the security assertion identifies the authority trusted by both the sender and the recipient as a result of examining the key used in signing the security assertion;
   after said determining that the key identifies the trusted authority, ascertaining that a signature of the security assertion is valid;
   after said ascertaining that the signature of the security assertion is valid, determining that the signature of the signed message is valid; and
   after said determining that the signature of the signed message is valid, accepting the signature of the signed message as valid.

8. The computer program product of claim 6, said validating comprising:
   determining that the key used in signing the security assertion does not identify the authority trusted by both the sender and the recipient as a result of examining the key used in signing the security assertion; and
   rejecting the signature of the signed message as invalid.

9. The computer program product of claim 6, said validating comprising:
   determining that the key used in signing the security assertion identifies the authority trusted by both the sender and the recipient as a result of examining the key used in signing the security assertion;
   determining that a signature of the security assertion is invalid subsequent to determining that the key identifies the trusted authority; and
   rejecting the signature of the signed message as invalid.

10. The computer program product of claim 6, said validating comprising:
    determining that the key used in signing the security assertion identifies the authority trusted by both the sender and the recipient as a result of examining the key used in signing the security assertion;
    after said determining that the key identifies the trusted authority, ascertaining that a signature of the security assertion is valid;
    after said ascertaining that the signature of the security assertion is valid, determining that the signature of the signed message is invalid; and
    after said determining that the signature of the signed message is invalid, rejecting the signature of the signed message as invalid.

11. A computer system comprising a processor, a memory coupled to the processor, and a computer readable storage device coupled to the processor, said storage device containing program code configured to be executed by the processor via the memory to implement a method for verifying a signature of a signed message, said method comprising:

receiving, by a recipient, the signed message from a sender, wherein the signed message comprises a compact attribute comprising a plurality of content types, the content types appearing in a predefined order within the compact attribute, the content types being collectively identified by a single object identifier associated with the compact attribute, the compact attribute comprising a processing flag and a security assertion, wherein the processing flag comprises rules to process the security assertion, and wherein the security assertion is made by an authority trusted by both the sender and the recipient;

recovering the content types of the compact attribute comprising the processing flag and the security assertion, by parsing the signed message from said receiving, wherein said parsing comprises utilizing the predefined order of the content types within the compact attribute; and validating whether the signature of the signed message is valid based on the processing flag and the security assertion, wherein said validating comprises determining, via use of the rules, either that a key used in signing the security assertion identifies, or that the key does not identify, the authority trusted by both the sender and the recipient as a result of examining the key used in signing the security assertion.

12. The computer system of claim 11, said validating comprising:
    determining that the key used in signing the security assertion identifies the authority trusted by both the sender and the recipient as a result of examining the key used in signing the security assertion;
    after said determining that the key identifies the trusted authority, ascertaining that a signature of the security assertion is valid;
    after said ascertaining that the signature of the security assertion is valid, determining that the signature of the signed message is valid; and
    after said determining that the signature of the signed message is valid, accepting the signature of the signed message as valid.

13. The computer system of claim 11, said validating comprising:
    determining that the key used in signing the security assertion does not identify the authority trusted by both the sender and the recipient as a result of examining the key used in signing the security assertion; and
    rejecting the signature of the signed message as invalid.

14. The computer system of claim 11, said validating comprising:
    determining that the key used in signing the security assertion identifies the authority trusted by both the sender and the recipient as a result of examining the key used in signing the security assertion;
    determining that a signature of the security assertion is invalid subsequent to determining that the key identifies the trusted authority; and
    rejecting the signature of the signed message as invalid.

15. The computer system of claim 11, said validating comprising:
    determining that the key used in signing the security assertion identifies the authority trusted by both the sender and the recipient as a result of examining the key used in signing the security assertion;

after said determining that the key identifies the trusted authority, ascertaining that a signature of the security assertion is valid;

after said ascertaining that the signature of the security assertion is valid, determining that the signature of the signed message is invalid; and after said determining that the signature of the signed message is invalid, rejecting the signature of the signed message as invalid.

16. A process for supporting computer infrastructure, said process comprising providing at least one support service for at least one of creating, integrating, hosting, maintaining, and deploying computer-readable code in a computing system, wherein the code in combination with the computing system is capable of performing a method for verifying a signature of a signed message, said method comprising:

receiving, by a recipient, the signed message from a sender, wherein the signed message comprises a compact attribute comprising a plurality of content types, the content types appearing in a predefined order within the compact attribute, the content types being collectively identified by a single object identifier associated with the compact attribute, the compact attribute comprising a processing flag and a security assertion, wherein the processing flag comprises rules to process the security assertion, and wherein the security assertion is made by an authority trusted by both the sender and the recipient;

recovering the content types of the compact attribute comprising the processing flag and the security assertion, by parsing the signed message from said receiving, wherein said parsing comprises utilizing the predefined order of the content types within the compact attribute; and validating whether the signature of the signed message is valid based on the processing flag and the security assertion, wherein said validating comprises determining, via use of the rules, either that a key used in signing the security assertion identifies, or that the key does not identify, the authority trusted by both the sender and the recipient as a result of examining the key used in signing the security assertion.

17. The process of claim 16, said validating comprising:
determining that the key used in signing the security assertion identifies the authority trusted by both the sender and the recipient as a result of examining the key used in signing the security assertion;

after said determining that the key identifies the trusted authority, ascertaining that a signature of the security assertion is valid;

after said ascertaining that the signature of the security assertion is valid, determining that the signature of the signed message is valid; and after said determining that the signature of the signed message is valid, accepting the signature of the signed message as valid.

18. The process of claim 16, said validating comprising:
determining that the key used in signing the security assertion does not identify the authority trusted by both the sender and the recipient as a result of examining the key used in signing the security assertion; and rejecting the signature of the signed message as invalid.

19. The process of claim 16, said validating comprising:
determining that the key used in signing the security assertion identifies the authority trusted by both the sender and the recipient as a result of examining the key used in signing the security assertion;

determining that a signature of the security assertion is invalid subsequent to determining that the key identifies the trusted authority; and rejecting the signature of the signed message as invalid.

20. The process of claim 16, said validating comprising:
determining that the key used in signing the security assertion identifies the authority trusted by both the sender and the recipient as a result of examining the key used in signing the security assertion;

after said determining that the key identifies the trusted authority, ascertaining that a signature of the security assertion is valid;

after said ascertaining that the signature of the security assertion is valid, determining that the signature of the signed message is invalid; and after said determining that the signature of the signed message is invalid, rejecting the signature of the signed message as invalid.

* * * * *